United States Patent [19]
Roojen

[11] 3,741,231
[45] June 26, 1973

[54] FLUID FLOW REGULATOR FOR HYDROSTATIC BEARING PADS
[75] Inventor: Jan Van Roojen, Rockford, Ill.
[73] Assignee: The Ingersoll Milling Machine Company, Rockford, Ill.
[22] Filed: Jan. 12, 1972
[21] Appl. No.: 217,355

[52] U.S. Cl.................. 137/101, 137/118, 308/9, 308/122
[51] Int. Cl. ......................................... G05d 11/00
[58] Field of Search................... 137/100, 101, 118; 308/9, 122

[56] References Cited
UNITED STATES PATENTS
417,034  12/1889  Hyatt................................. 137/100
3,442,560  5/1969  De Gast............................. 308/9 X
3,044,486  7/1962  Miller............................. 137/505.42

Primary Examiner—Robert G. Nilson
Assistant Examiner—Edward Look
Attorney—Wolfe, Hubbard, Leydig, Voit & Osann, Ltd.

[57] ABSTRACT

Equalization of the narrow widths of the fluid flow regulating gaps in a hydrostatic bearing system as shown in U.S. Pat. No. 3,442,560 is facilitated by making the outer wall of one of the gaps flexible and providing for axial adjustment of such wall from the exterior of the assembly.

8 Claims, 4 Drawing Figures

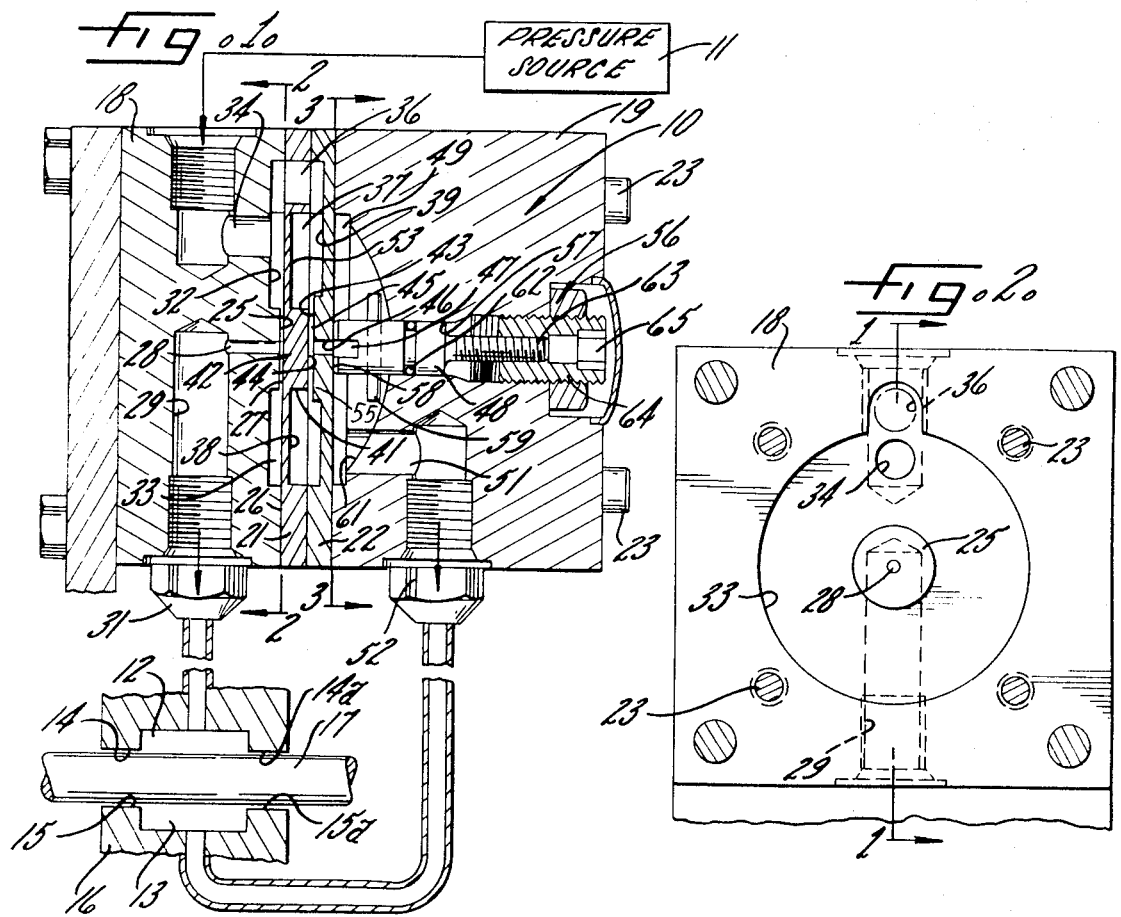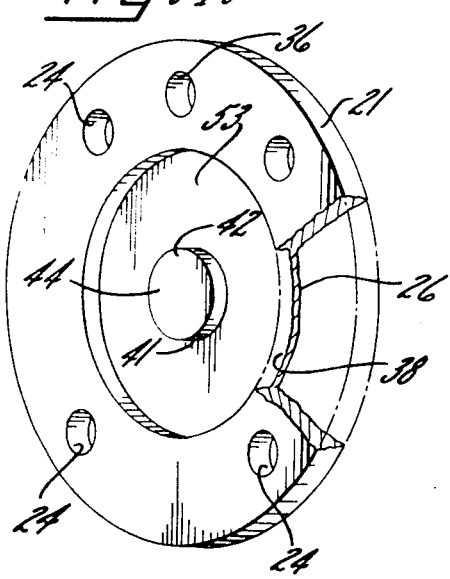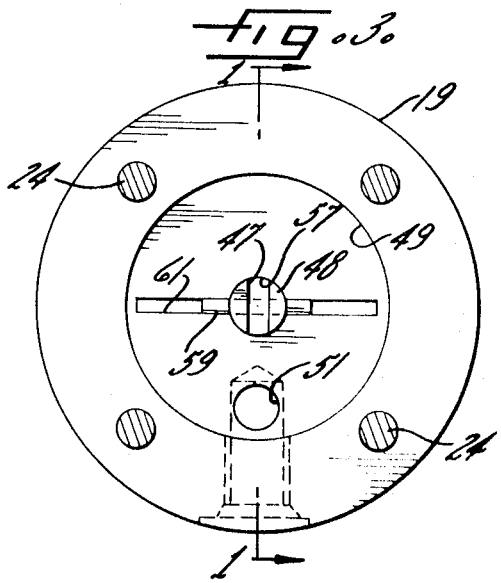

3,741,231

FLUID FLOW REGULATOR FOR HYDROSTATIC BEARING PADS

BACKGROUND OF THE INVENTION

This invention relates to a device as shown in U.S. Pat. No. 3,442,560 for automatically regulating the flow of pressure fluid to a pair of hydrostatic bearing pads disposed on opposite sides of and providing a frictionless support for a movable member such as a rotary shaft or a slidable machine element.

SUMMARY OF THE INVENTION

The present invention improves upon the patented construction by providing for easy initial and fine adjustment of the relative widths of the gaps controlling the continuous flow of pressurized fluid to the respective bearing pads. This objective is achieved by forming one of the two gaps with a resiliently flexible wall which may be bent in the direction of the membrane defining the inner walls of the two gaps whereby to equalize the widths of the gaps for efficient service use. Gaps of precisely the same thickness may thus be formed at a minimum cost.

The invention also resides in the novel manner of effecting the selective adjustment of the bendable gap wall and the novel construction of the membrane forming the inner walls of the flow controlling gaps.

BRIEF DESCRIPTION OF THE DRAWINGS

FIG. 1 is a sectional view of a fluid flow control for hydrostatic bearings embodying the novel features of the present invention, the section being taken in the plane of the line 1—1 of FIGS. 2 and 3.

FIGS. 2 and 3 are sections taken along the lines 2—2 and 3—3 of FIG. 1.

FIG. 4 is a perspective of the membrane.

DESCRIPTION OF THE PREFERRED EMBODIMENT

For purposes of illustration, the invention is shown embodied in a device 10 for controlling the continuous flow of fluid from a pressure source 11 to recesses or so-called pads 12 and 13 set in opposite surfaces 14 and 15 of a support 16 to provide a frictionless mounting for a movable member such as a rotary shaft 17. The pads may be of any desired shape and the sill surfaces surrounding the same are spaced from the opposed surface of the shaft a few thousandths, usually from .001 to .005 of an inch depending on the size of the pads and the load to be carried. The clearance $14^a$ and $15^a$ allow a continuous outflow of the pressurized fluid in all directions from the pads and along the sills.

The device 10 comprises a housing formed by end blocks 18 and 19 separated by a partition plate 21 and a plate 22, all four of which have flat surfaces around their outer peripheries rigidly clamped together by bolts 23 extending through alined holes 24 angularly spaced around the four parts. A flat and preferably circular surface 25 on the inner end and at the center of the block 18 cooperates with the opposing flat end surface 26 of the partition 21 to form a narrow gap 27, usually 0.002 to 0.010 in thickness. At its center, the gap communicates with a passage 28 of small diameter leading to the inner end of a bore 29 and through a fitting 31 and suitable piping to the pad 12.

An annular groove 32 formed in the inner end of the block 18 cooperates with the partition surface 26 to form a cavity 33 communicating through a passage 34, a suitable fitting and piping with the high pressure source 11 usually maintained at from 300 to 1500 psi depending on the load to be supported. Through a cross-hole 36 in the outer edge portion of the partition, the pressurized fluid is supplied to an annular cavity 37 defined by a groove 38 formed in the end of the partition and a groove 39 in the inner end of the plate 22.

The inner wall 41 of the groove 38 is the outer cylindrical periphery of a button 42 integral with and projecting from the center of the partition toward but short of a flat end surface 43 on the inner side of the plate 22. The circular end surface 44 of the button matches the diameter of the gap 27 and cooperates with the plate surface 43 to form a narrow gap 45 controlling the flow of fluid from the cavity 37 to the other bearing pad 13. Herein such flow is from the center of the gap 45 through a cross-hole 46 in the plate 22, a slot 47 extending across the inner end of a rod 48 to an annular groove 49 in the inner end of the block 19. Fluid from this groove is conducted to the bearing pad 13 through a bore 51, a fitting 52, and suitable piping. The diameter of the gap 45 determined by the end surface 44 of the button 42 is made equal to that of the gap 27 as determined by the diameter of the inner wall 41 of the groove 38 in the block 18.

The partition is composed of resilient material such as steel and the annular part thereof between the bottom of the groove 38 and the opposite end surface 26 is made thin enough, from 0.002 to 0.10 of an inch depending on the diameter to constitute a membrane 53 which is bendable axially in response to a change in lateral loading on the shaft 17 resulting in the development of a differential, for example, 100 psi, between the fluid pressures in the gaps 27 and 45. For example, if the suppported shaft is overloaded in a direction to reduce the sill clearance of the bearing pad 13, the resulting increase in pressure in this pad is transmitted back to the gap 45, the accompanying reduced pressure in the pad 12 and the gap 27 forcing the membrane to flex under the increased pressure and widen the gap 45 and allow an increased flow of the high pressure fluid to the pad 13. Such flow continues until the increased load has been overcome and the film thicknesses around the two pads are again equalized. The use of the membrane 53 in this manner corresponds to the action of the so-called diaphragm 8 in the patented construction above referred to.

To utilize the membrane and the two gaps in regulating the flow of high pressure fluid to a double pad hydrostatic bearing system of the above character, it is important that the two gaps be of precisely equal width when the load on or exerted by the supported element, the shaft in this instance, is such as to equalize the pressure in the two pads. The membrane is then in the centered position shown in FIG. 1 and the gaps 27 and 45 are of equal width. A difference as small as 0.0001 of an inch in the widths of the gaps may result in a difference in the two flow rates of as much as thirty percent. It is difficult and very costly, even by precision manufacture of the gap defining surfaces involved to achieve precise equalization of the gap widths. Such high precision is obtained in accordance with the present invention by making the outer wall of one of the gaps, in this instance the gap 45, flexible enough to permit axial bending and adjustment of the wall position from the exterior of the assembly so as to precisely match the width of the adjustable gap 45 with that of the fixed gap 27.

To the foregoing ends, the outer wall 43 of the gap 45 is on the separate plate 22 which is formed with an annular area 55 which is thick enough to remain in a fixed axial position under the pressures attained in the gap during service operation but bendable axially by an externally applied force of proper magnitude so as to permit the wall 43 to be moved toward the end 44 of the button 42 until the gap 45 is reduced to a width precisely equal to that of the fixed width gap 27.

While such axial bending of the plate 22 may be effected by adjusters of various types, it is preferred to employ a differential screw arrangement 56 selectively and manually operable to advance the rod 48 which is slidable in a bore 57 in the block 19 and bearing at its inner end 58 against the center of the adjusting plate 22. The rod is held against turning by a crosspin 59 therein disposed in a slot 61 in the block 19, the rod being surrounded by a seal ring 62. On the outer end portion of the rod 48 is a thread 63 mating with an internal thread on a nut 64 having an external thread of coarser pitch threaded into the outer end of a bore in the block 19. The recessed head 65 of the nut is exposed for manual turning to effect, through the screw threads of slightly different pitch, advance of the rod 48 at an extremely slow rate thus providing for a very fine axial adjustment of the wall 43 and the width of the gap 45.

To utilize the bendable and adjustable wall 43 in achieving initial precise equalization of the widths of the gaps 27 and 45, the surfaces on the blocks 18 and 19, the partition 21, and the plate 22 are machined to impart, after initially clamping the parts together by the bolts 23, a fixed width to the gap 27 and while making the gap 45 of somewhat greater width. Then, by turning the head 65 of the differential screw, the rod 48 may be advanced along the bore 57 and the plate 22 bent axially until the gap 45 is reduced to a width precisely equal to that of the fixed gap 27. The extent of the plate bending required may be determined by comparing the outward fluid flows through the gaps and reducing the width of the gap 45 until the flow rates are precisely equalized.

It will be apparent that by employing the axially flexible plate 22 and the differential screw adjuster, manufacture and assembly of the parts to impart equal widths to the gaps 27, 45 preparatory to service use of the bearings is achieved easily and at minimum cost. This is particularly advantageous when the supported element, such as the work table of a machine tool, is relatively long and a number of pairs of pads are required to provide the desired frictionless mounting. For such installations, membrane arrangements of the above character may be disposed side by side and spaced along a common housing, optimum compactness being achieved by employing membrane with buttons having gap defining surfaces of square or rectangular shape instead of circular surfaces as in the form above described.

I claim:

1. For regulating the rate of continuous flows from a pressure source to and from two hydrostatic bearing pads, the combination of, a housing defining opposed walls and an intervening partition rigidly joined around their peripheries and defining fluid cavities between opposite sides of said partition and said opposed walls, passage means for supplying fluid to each of said cavities, means rigid with and defining the central area of said partition and providing oppositely facing flat surfaces cooperating with the opposed areas of said walls to define thin parallel gaps, fluid outlet passages extending outwardly through said walls from the central areas of said gaps, the areas of said partition surrounding said gaps constituting a membrane sufficiently thin to bend axially in opposite directions in response to opposite pressure differentials developed between said fluid outlet passages, and one of said walls being movable axially toward said partition to vary the thickness of the gap defined by such wall and the opposed partition surface, and adjusting means mounted on and accessible from the exterior of said housing and selectively operable to vary the thickness of the adjustable gap so as to match the thickness of the other gap.

2. The combination defined in claim 1 in which the gap between said partition and said movable wall is of greater thickness than the other gap when the movable wall is free of engagement with said adjusting means, and said adjusting means, when operated, being operable to reduce the thickness of the associated gap to match the thickness of the other gap.

3. The combination defined in claim 1 in which said movable wall is the central axially flexible area of a plate clamped between the peripheries of said partition and the adjacent part of said housing.

4. The combination defined in claim 3 in which the inner wall of one of said gaps is defined by a flat end surface of said partition and the inner wall of the other gap is defined by the end of a button projecting from the thin area of the partition.

5. The combination defined in claim 4 in which the active end surface of said button is circular.

6. The combination defined in claim 1 in which the adjustment of said movable gap defining wall is effected by a differential screw.

7. The combination defined in claim 1 in which the means for adjusting said movable wall comprises a plunger slidable endwise in said housing, a first nut threaded onto said plunger and a second manually adjustable nut threaded onto said first nut and having a thread of greater pitch than the first nut.

8. In a controller for regulating the rate of continuous flow of presrure fluid to the pad of a hydrostatic bearing and through the sill clearance thereof, said controller including a rigid housing having an inlet passage communicating with a source of fluid under pressure and an outlet passage leading to said pad, a resilient and axially flexible membrane constituting a partition dividing said housing internally, and a rigid wall opposing and axially spaced from the membrane and defining between the central areas of the two a restriction in the form of a thin gap through which fluid from said inlet passage flows in all radial directions through the gap and to said outlet passage whereby said membrane is responsive to pressure changes within the housing to vary the width of said gap and therefore the rate of flow of fluid to said pad with changes in the loading of said bearing, the improvement which cinsists in forming said rigid wall of said gap on a partition plate opposing and axially spaced from said membrane and axially flexible to vary the effective width of said gap, and means mounted on and accessible from the exterior of said housing and selectively operable to flex said plate axially and thereby adjust the width of said gap to establish, preparatory to service use of the controller, a width corresponding to the desired restriction of flow of fluid to said bearing pad.

* * * * *